United States Patent
Kim et al.

(10) Patent No.: US 9,367,231 B2
(45) Date of Patent: Jun. 14, 2016

(54) MOBILE TERMINAL AND CONTROLLING METHOD THEREOF

(71) Applicant: LG ELECTRONICS INC., Seoul (KR)

(72) Inventors: Miyoung Kim, Seoul (KR); Suegyoung Kim, Seoul (KR); Jongsup Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 430 days.

(21) Appl. No.: 13/921,867

(22) Filed: Jun. 19, 2013

(65) Prior Publication Data

US 2013/0342482 A1 Dec. 26, 2013

(30) Foreign Application Priority Data

Jun. 25, 2012 (KR) ........................ 10-2012-0067778

(51) Int. Cl.
*G06F 3/0488* (2013.01)
*G06F 3/041* (2006.01)

(52) U.S. Cl.
CPC ............ *G06F 3/0488* (2013.01); *G06F 3/0416* (2013.01); *G06F 3/04886* (2013.01); *G06F 2203/04803* (2013.01); *G06F 2203/04806* (2013.01)

(58) Field of Classification Search
CPC .................. G06F 3/04886; G06F 2203/04803
See application file for complete search history.

(56) References Cited

U.S. PATENT DOCUMENTS

| | | | | |
|---|---|---|---|---|
| 2008/0158189 A1* | 7/2008 | Kim | .................... | G06F 3/04886 345/173 |
| 2010/0097338 A1* | 4/2010 | Miyashita | ........... | G06F 3/04883 345/173 |
| 2012/0127192 A1* | 5/2012 | Cheong | .................... | G09G 5/14 345/589 |
| 2013/0167078 A1* | 6/2013 | Monnig | ................ | G06F 3/0484 715/800 |
| 2014/0028681 A1* | 1/2014 | Hirayama | .......... | G01R 31/3606 345/440 |

* cited by examiner

*Primary Examiner* — Kathy Wang-Hurst
*Assistant Examiner* — Peijie Shen
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a touch screen display configured to display contents; and a controller configured to receive a touch and drag action across the touch screen display, display a moveable partitioning graphic at a position corresponding to the touch and drag action and partition the displayed contents into first and second display regions, and independently control a function of the contents in the first display region and independently control a function of the contents in the second display region.

14 Claims, 16 Drawing Sheets (a)　　　　　　　　　　　(b)

MOBILE TERMINAL AND CONTROLLING METHOD THEREOF

CROSS-REFERENCE TO A RELATED APPLICATION

Pursuant to 35 U.S.C. §119(a), this application claims the benefit of earlier filing date and right of priority to Korean Application No. 10-2012-0067778, filed on Jun. 25, 2012, the contents of which are hereby incorporated by reference herein in their entirety.

BACKGROUND OF THE INVENTION

1. Field of the Invention

The present invention relates to a mobile terminal and corresponding method for displaying a moveable partitioning graphic at a position corresponding to a touch and drag action and partitioning the displayed contents into first and second display regions, and independently controlling a function of the contents in the first and second display regions.

2. Discussion of the Related Art

A mobile terminal can perform various functions such as data and voice communications, capturing images and video via a camera, recording audio, playing music files and outputting music via a speaker system, and displaying images and video on a display. Some terminals support game playing, while other terminals are also configured as multimedia players. More recently, mobile terminals have been configured to receive broadcast and multicast signals which permit viewing of contents such as videos and television programs. Generally, terminals can be classified into mobile terminals and stationary terminals. In addition, mobile terminals can be further classified into handheld terminals and vehicle mount terminals.

Recently, the size of the display screen on a terminal has increased. However, the amount of space is not efficiently used on the display screen.

SUMMARY OF THE INVENTION

Accordingly, one aspect of the present invention is to provide a mobile terminal and controlling method thereof that substantially obviate one or more problems due to limitations and disadvantages of the related art.

Another aspect of the present invention is to provide a mobile terminal and corresponding method for efficiently controlling a plurality of partitioned regions of a screen.

To achieve these objects and other advantages and in accordance with the purpose of the invention, the present invention provides in one aspect a mobile terminal including a wireless communication unit configured to wirelessly communicate with at least one other terminal; a touch screen display configured to display contents; and a controller configured to receive a touch and drag action across the touch screen display, display a moveable partitioning graphic at a position corresponding to the touch and drag action and partition the displayed contents into first and second display regions, and independently control a function of the contents in the first display region and independently control a function of the contents in the second display region. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
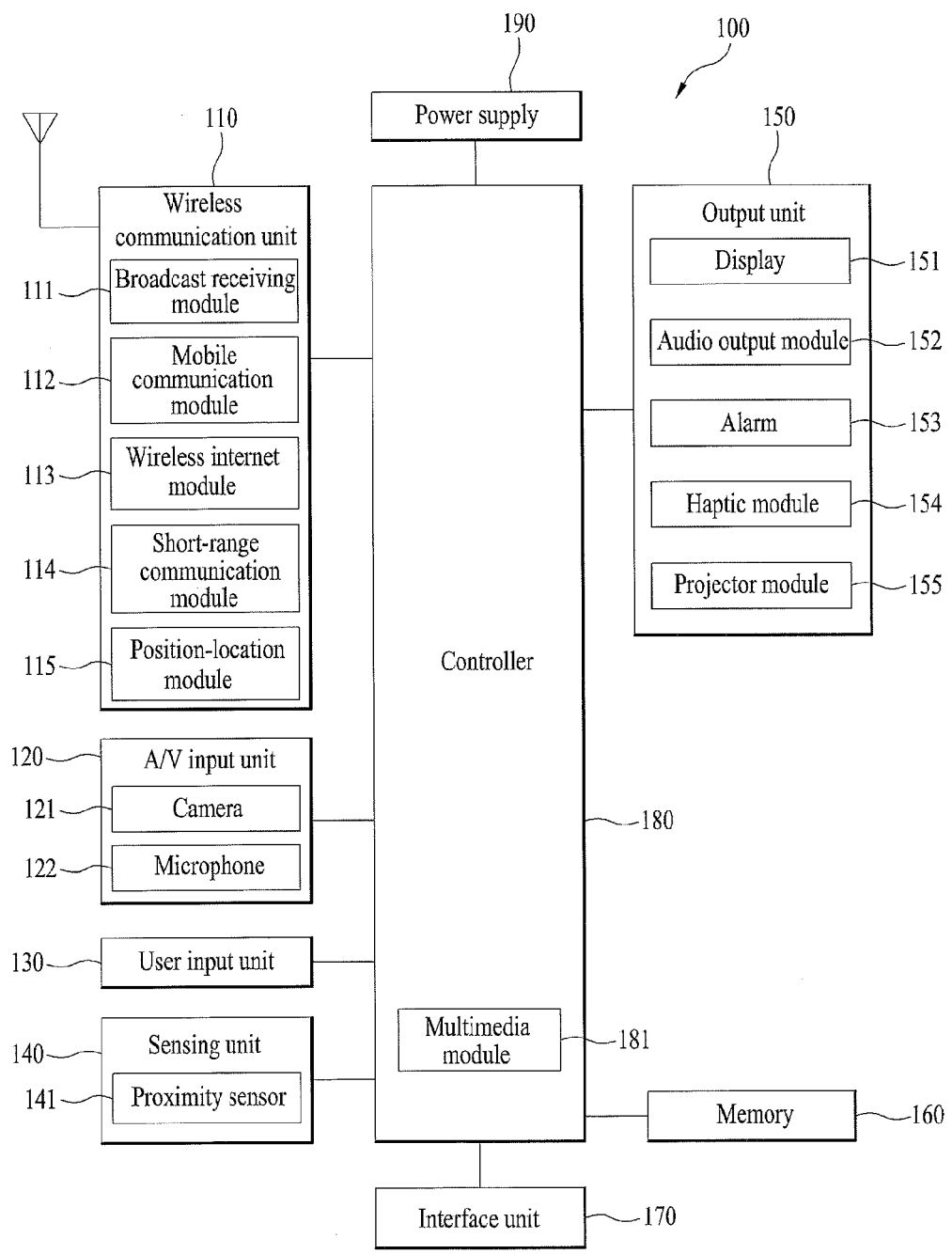
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 including a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

The wireless communication unit 110 generally includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

Further, the broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 generally includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100.

As an example, consider the mobile terminal 100 being configured as a slide-type mobile terminal. In this configuration, the sensing unit 140 can sense whether a sliding portion of the mobile terminal is opened or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is generally implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it can use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor can detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Referring to FIG. 1, the proximity sensor 141 can be provided to an internal area of the mobile terminal 100 enclosed by the touchscreen or around the touchscreen. The proximity sensor 141 detects a presence or non-presence of an object approaching a prescribed detecting surface or an object existing around the proximity sensor using an electromagnetic field strength or infrared ray without mechanical contact. Hence, the proximity sensor 141 has a durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 can output a signal for announcing the event occurrence using vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 performs an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing mechanism for producing an image to output externally using the light generated from the light source, and a lens for enlarging and outputting the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is a chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 generally controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
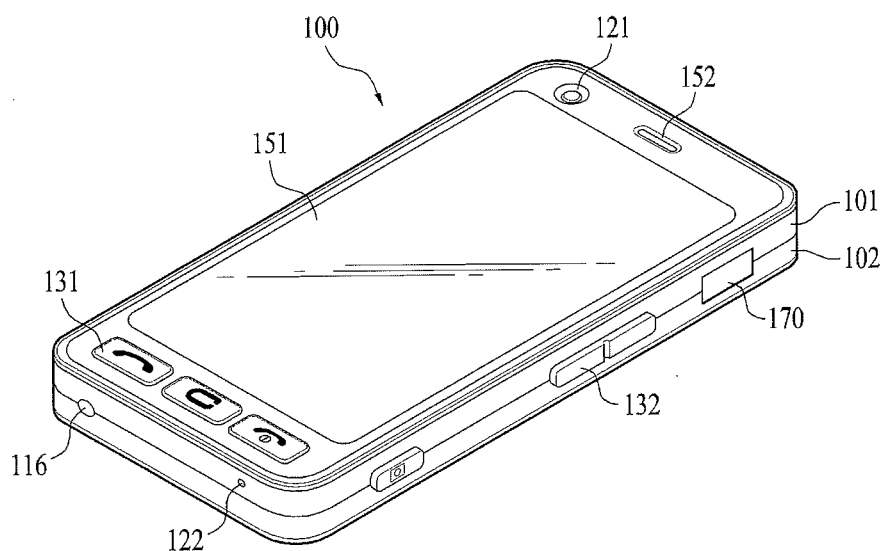
FIG. 2A is a front perspective diagram of a mobile terminal according to one embodiment of the present invention.

Next, FIG. 2A is a front perspective diagram of the mobile terminal 100 according to one embodiment of the present invention.

The mobile terminal 100 shown in the drawing has a bar type terminal body. However, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. Such teachings apply equally to other types of mobile terminals.

Referring to FIG. 2A, the mobile terminal 100 includes a case (casing, housing, cover, etc.) configuring an exterior thereof. In the present embodiment, the case is divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

Figure 2B:
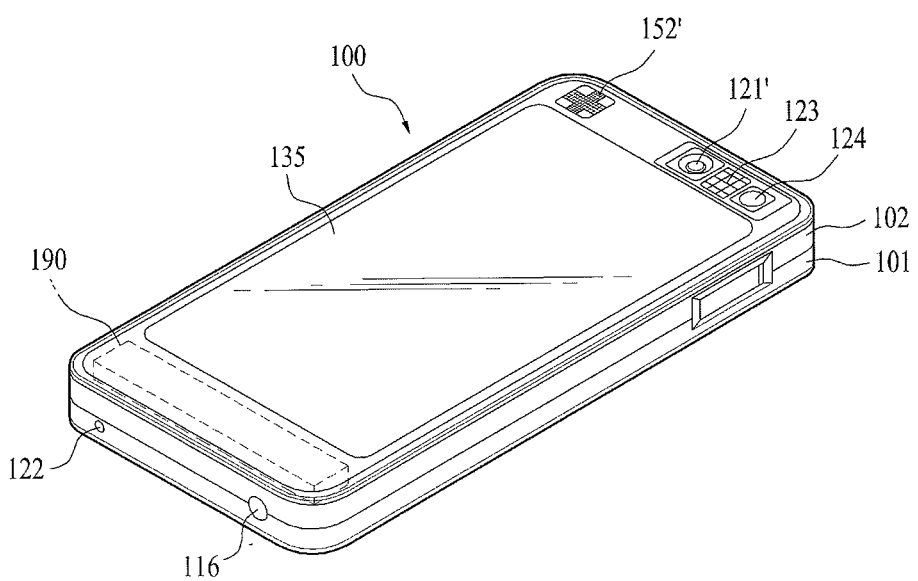
FIG. 2B is a rear perspective diagram of a mobile terminal according to one embodiment of the present invention.

Next, FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121 has a photographing direction that is substantially opposite to that of the former camera 121 shown in FIG. 2A and may have pixels differing from those of the firmer camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this instance, if the display 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

According to one embodiment of the present invention, a reference line is set on a scrollable content and each region partitioned by the reference line is separately controlled.

Figure 3:
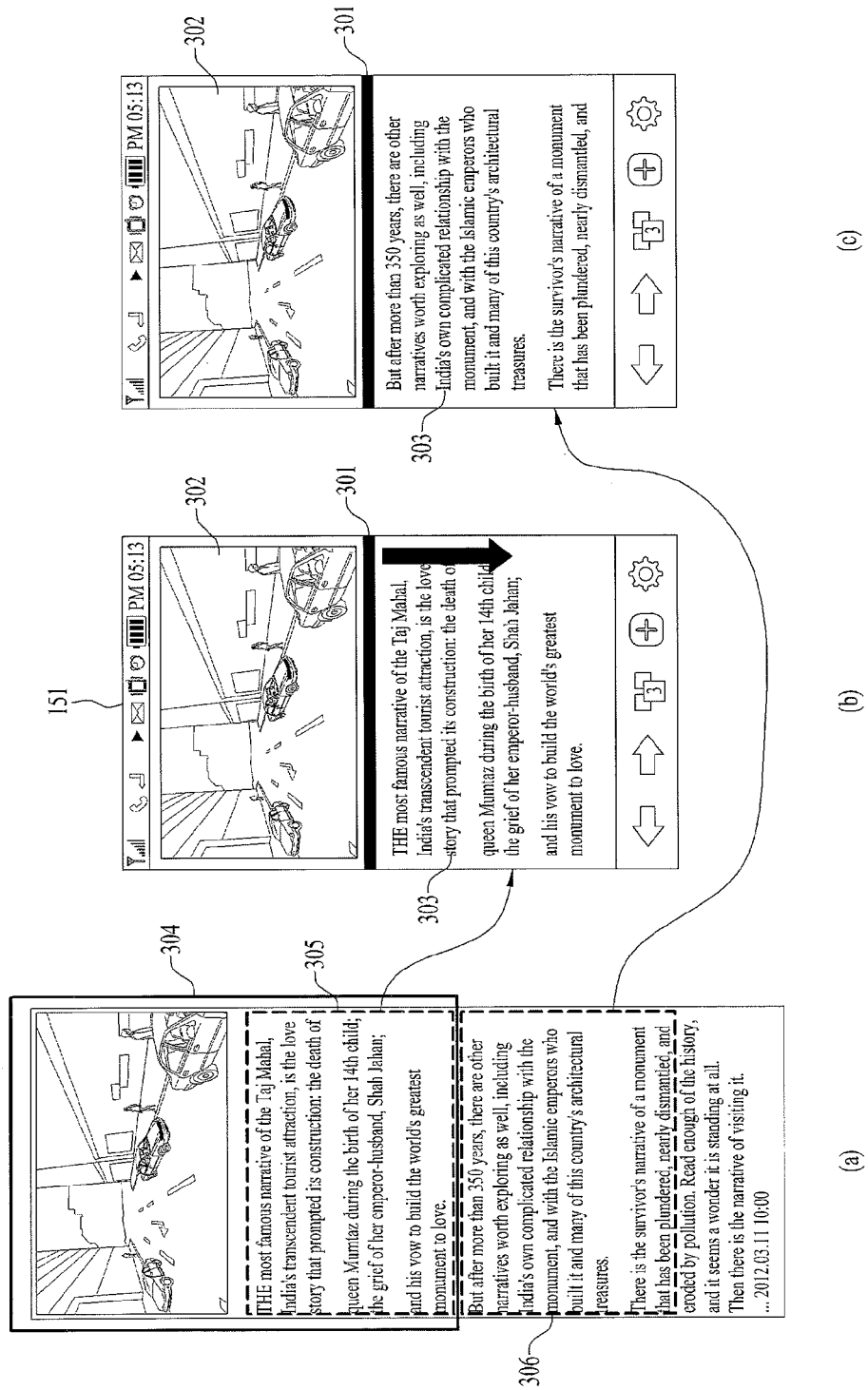
FIG. 3 includes display screens illustrating a screen partitioning process according to one embodiment of the present invention.

In more detail, FIG. 3 includes display screens illustrating a method for partitioning a screen according to one embodiment of the present invention. In particular, FIG. 3(*a*) shows a content existing on a webpage and FIGS. 3(b) and 3(c) show examples of viewing the webpage via the mobile terminal 100. In this instance, a text, a video content and/or the like may be output via the display unit 151. In doing so, the entire content may not be displayed on one screen of the mobile terminal 100.

Thus, the mobile terminal shown in FIG. 3(b) outputs the content corresponding to a solid line box 304 on the webpage shown in FIG. 3(a). In addition, the mobile terminal 100 shown in FIG. 3(b) outputs a text content existing within a first dotted line box 305 belonging to the text content shown in FIG. 3(a).

In this situation, a user may need to switch the screen while an output of a specific entity is continuously maintained. For instance, while the image shown in FIG. 3 is fixedly displayed, the user may want to scroll the text. Thus, according to one embodiment of the present invention, the screen can be partitioned and then one portion of the screen is maintained while the other can be scrolled. The partitioned portions can also be independently controlled (e.g., both individually controlled).

In more detail, a reference line (or bar) 301 is horizontally displayed in the middle of the display unit 151 and the screen is partitioned into an upper region (hereinafter named a first region) 302 above the reference line 301 and a lower region (hereinafter named a second region) 303 below the reference line 301. Referring to FIG. 3(b), the user can input a command for scrolling a screen of the second region 303. For example, the command for scrolling the screen may include one of a touch drag, a touch flicking and the like.

If the command is input, referring to FIG. 3(c), the controller 180 can apply a scroll function to the screen currently output to the second region 303 only and fix the screen currently output to the first region 302. Therefore, the rest 306 of the text content shown in FIG. 3(a), which isn't displayed on the screen shown in FIG. 3(b), can be displayed. Both regions may also be individually controlled (e.g., scrolled).

Moreover, the above-described screen control is not limited by the screen scroll function only. For example, the above-described screen control is applicable to a screen control function such as a screen zoom-in, a screen zoom-out and the like.

Figure 4:
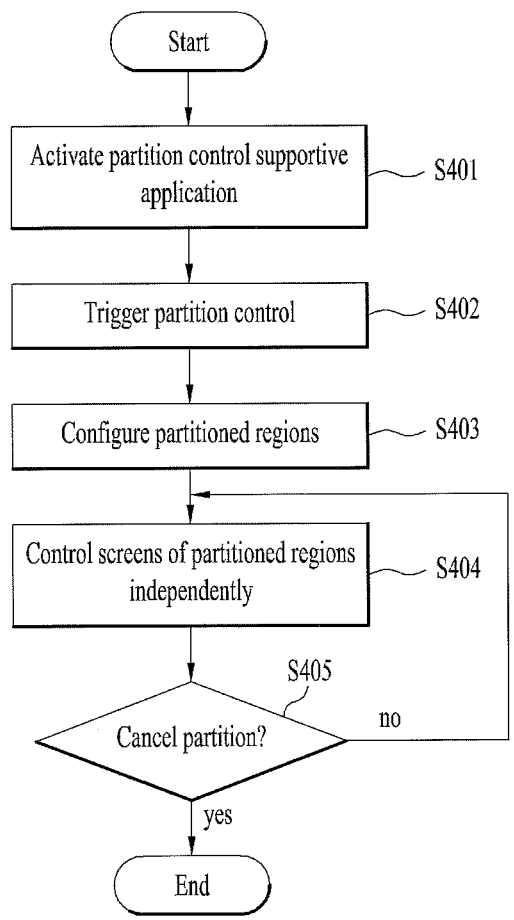
FIG. 4 is a flowchart illustrating a method for performing a partitioning control function in a mobile terminal according to one embodiment of the present invention.

Next, FIG. 4 is a flowchart illustrating a method for performing a partitioning control function in a mobile terminal according to one embodiment of the present invention. Referring to FIG. 4, an application supportive of a partitioning control function is automatically activated in response to a user's input, an occurrence of a specific event or a setting (S401).

While the partitioning control function supportive application is active, the partitioning control function is triggered in response to a user's command input (S402). Alternatively, the partitioning control function can be automatically triggered as soon as the application is activated in accordance with the settings of the application.

Subsequently, a partitioned region is configured (S403). In this instance, the partitioned region includes the regions created by partitioning a region by a reference line. In addition, the partitioned region corresponds to the region output to the first region 302 or the second region 303 shown in FIG. 3.

Once the partitioned region is configured, the controller 180 can control each of the first and second regions 302 and 303 partitioned by the reference line independently. Thereafter, when a command for cancelling the partitioned region or the corresponding application is input, the partitioning control function is cancelled (S405).

Next, a method of triggering the partition control in step S402 in FIG. 4 will be explained with reference to FIGS. 5 and 6.

Figure 5:
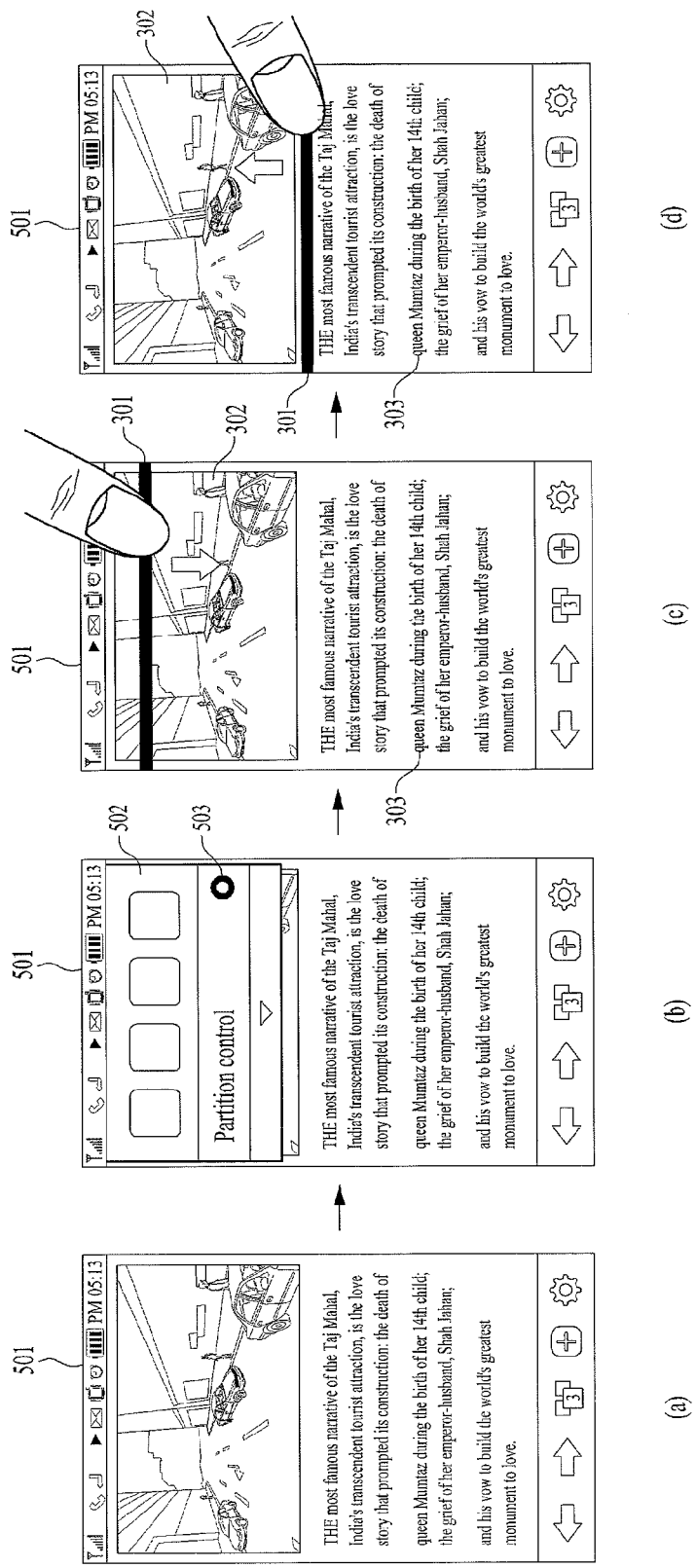
FIG. 5 includes display screens illustrating a method for triggering a partitioning control function according to one embodiment of the present invention.

In more detail, FIG. 5 includes display screens illustrating a method for triggering a partitioning control function according to one embodiment of the present invention. In particular, FIG. 5(a) shows an active screen of an application supportive of a partitioning control function. The active screen is a web browser application. In addition, an indicator region 501 is displayed on a top end of the active screen.

Referring to FIG. 5(a), the indicator region 501 displays various operating states (e.g., a present time, a battery level, a wireless signal reception strength, etc.) of the mobile terminal 100. The indicator region 501 is generally always displayed on a predetermined region of the display unit 151 except when a prescribed application is using the full screen.

In addition, FIG. 5(b) shows a menu screen 502 is displayed during the ongoing application. In addition, the menu screen 502 can be scrolled downwards by touching and dragging the indicator region 501 in the bottom direction. The menu screen 502 may include a partition control button 503 for activating/deactivating the partitioning control function. If the partition control button 503 is selected by a user, referring to FIG. 5(c), the controller 180 displays a reference line 301 that partitions the display area into the first and second regions 302 and 303. As mentioned in the foregoing description, the controller 180 can independently control the screens of the first and second regions 302 and 303 partitioned by the reference line 301, respectively.

FIG. 5(c) shows that the reference line 301 is displayed at a random position on the display unit 151. Thus, if the partition control button 503 is selected, the controller 180 positions the reference line 301 at a random position on the display unit 151. Alternatively, the reference line 301 may be configured at a preset position. If the reference line 301 is displayed at the random position or the preset position, the user may want to move the reference line 301 to a desired position.

When the user wants to move the reference line 301 to the desired position, the user can shift or move the reference line 301 to the desired position by touching and dragging the reference line 301 and then dropping the reference line 301 onto the desired position.

FIG. 5(d) shows that the position of the reference line 301 has been moved by the user. In FIG. 5(d), the user wants to partition the screen into a photo region existing on an upper region of the screen and a text region existing on a lower region of the screen. As mentioned in the foregoing description, while the reference line 301 is touched at the position of the reference line 301 shown in FIG. 5(c), if a drag is performed, a movement of the reference line 301 moves with the touch and drag. In doing so, the reference line 301 approaches a boundary of the content, and the reference line 301 can be automatically situated on the boundary of the content.

Figure 6:
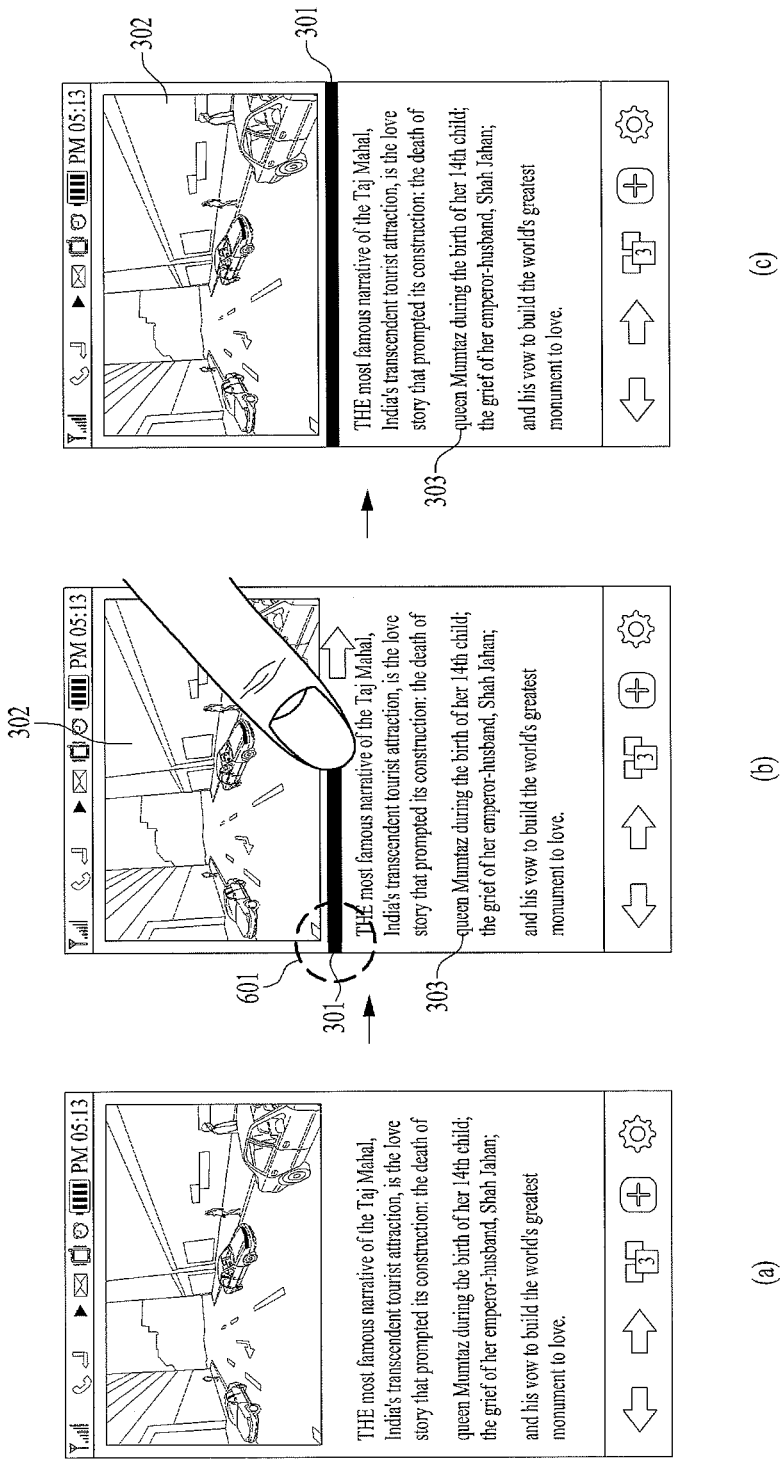
FIG. 6 includes display screens illustrating a method for triggering a partitioning control function according to another embodiment of the present invention.

Next, FIG. 6 includes display screens illustrating a method for triggering a partitioning control function according to another embodiment of the present invention. In particular, FIG. 6(a) shows an active screen of an application supportive of a partitioning control function. In addition, FIG. 6(b) illustrates creating a reference line 301 by a user's touch input.

Referring to FIG. 6, while a user touches one side 601 of the display unit 151, the user can perform a drag action towards the other side opposing the touched side 601. In response to the input, the controller 180 can position a reference line 301 starting with the one side 601 and crossing towards the opposite side. Moreover, as mentioned in the foregoing description, the screen control over each of the regions partitioned by the reference line 301 can be performed independently or separately.

Thus, the user touches and drags across the width of the terminal (or length) to partition the display into at least first and second display regions that can be independently controlled.

In the following description, a method of removing the reference line 301 to cancel the partitioned region in step S405 of FIG. 4 is explained in detail with reference to FIG. 7.

Figure 7:
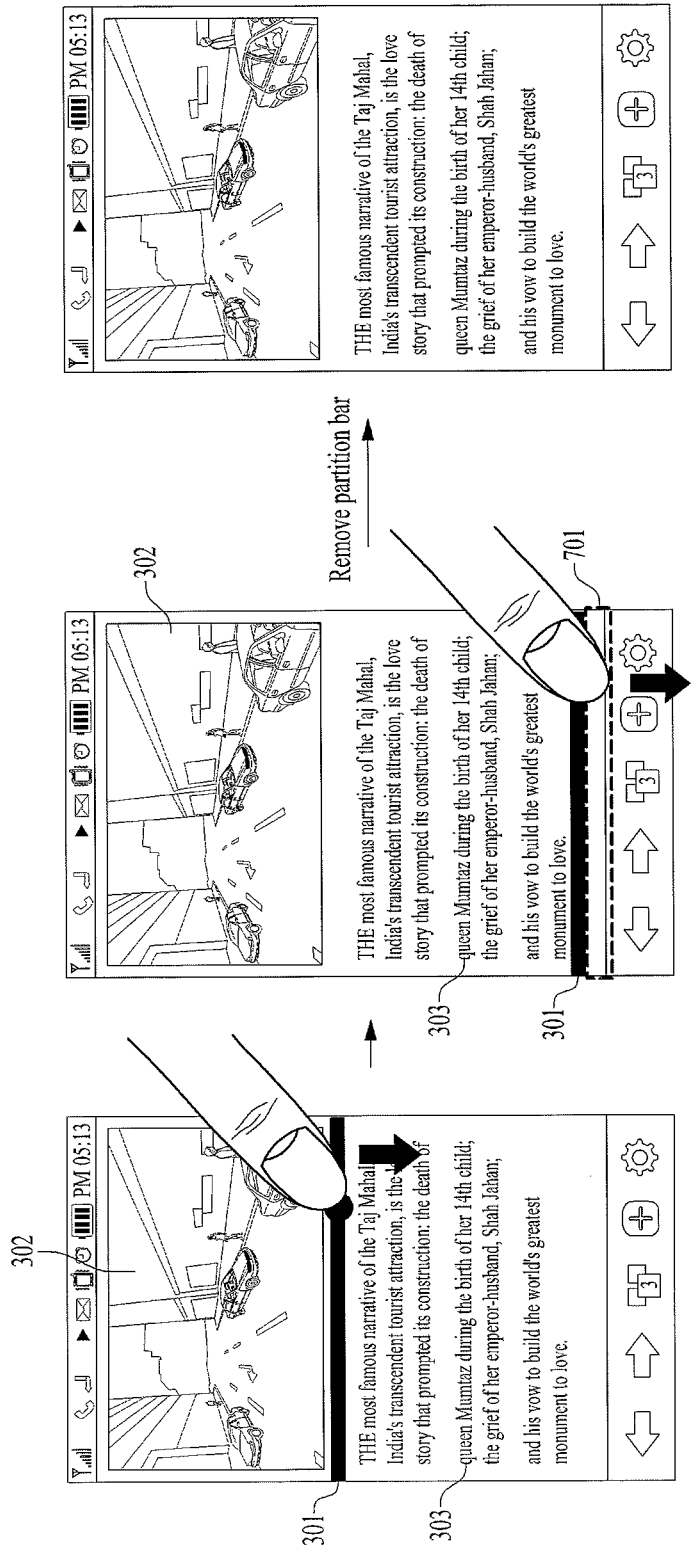
FIG. 7 includes display screens illustrating a method for cancelling a configuration of a reference line according to one embodiment of the present invention.

In more detail, FIG. 7 includes display screens illustrating a method for cancelling a configuration of the reference line 301 according to one embodiment of the present invention. FIG. 7 shows the screen on which the reference line 301 is displayed. When a user intends to cancel the partitioning control function, the user can remove the reference line 301 by shifting the position of the reference line 301 to a top or bottom side of the screen.

In particular, when the position of the reference line 301 is changed, if a size of the partitioned first or second region 302 or 303 becomes equal to or smaller than a prescribed value, the controller 180 removes the reference line 301 and then displays either the first region 302 or the second region 303 on a full screen of the display unit.

Referring to FIG. 7(*b*), the user has shifted the reference line 301 to the bottom side end of the terminal. If so, the size of the second region 303 partitioned by the reference line 301 becomes small as shown by a dotted line box 701. If the size of the second region 303 becomes equal to or smaller than the prescribed value, the controller 180 can cancel the configuration of the reference line 301. Thereafter, referring to FIG. 7(*c*), the controller 180 can display the first region 302 on the full screen of the display unit. In addition, the configuration of the reference line 301 can also be cancelled by shifting the reference line 301 to the top side end in the same manner.

Thus, after the screen has been partitioned into a plurality of regions, if a video content and a text content related to the video content are output to the partitioned regions, respectively, a user can view the contents more conveniently. Therefore, in the following description, the present invention provides a method of outputting contents to corresponding regions respectively by sorting the contents by types.

Figure 8:
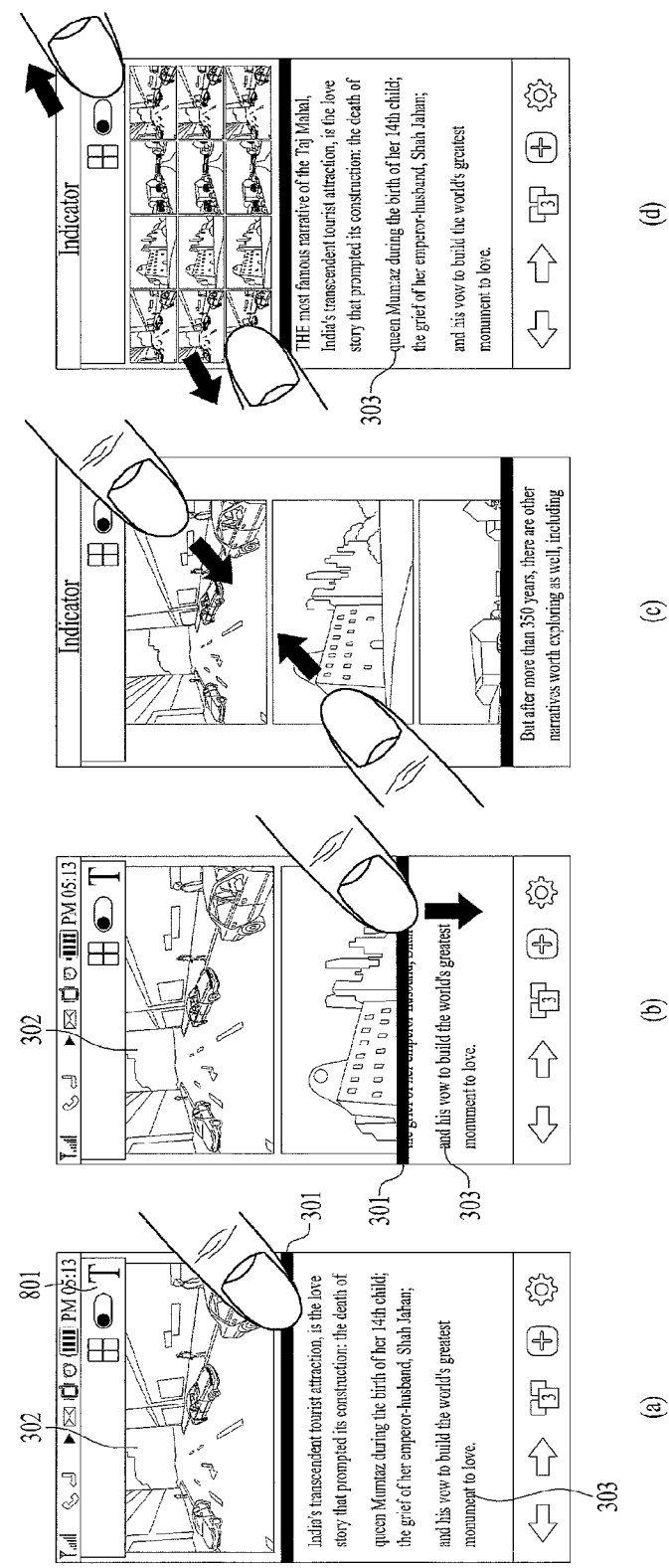
FIG. 8 includes display screens illustrating a method for sorting contents on regions portioned by a reference line according to one embodiment of the present invention.

In more detail, FIG. 8 includes display screens illustrating a method for sorting contents on regions portioned by a reference line according to one embodiment of the present invention.

Referring to FIG. 8(*a*), the controller 180 can output a sorting object 801 on the first region 302 partitioned by the reference line 301. In this instance, the sorting object 801 corresponds to an icon for sorting contents to be output to the first region 302. In the sorting object 801, four (4) boxes are situated on the left part, a capital letter 'T' is situated on the right part, and an indicator is situated in the middle part and that can move right and left.

If the indicator is situated toward the four boxes, video contents are sorted and then output to the first region 302 while the rest of the contents except the video contents are output to the second region 303. If the indicator is situated toward the capital letter 'T', text contents are sorted and then output to the first region 302 while the rest of the contents except the text contents are output to the second region 303.

Because the indicator of the sorting object 801 shown in FIG. 8(*a*) is situated toward the left part corresponding to the four boxes, the video contents are output to the first region 302 only. In addition, the rest of the contents (e.g., text contents) except the video contents are output to the second region 303.

If the position of the reference line 301 shown in FIG. 8(*a*) is adjusted, FIG. 8(*b*) shows that the number of the video contents currently output to the first region varies. As mentioned in the foregoing description, the position of the reference line 301 can be adjusted by touching the reference line 301 shown in FIG. 8(*a*) over a prescribed duration and then dragging the reference line 301.

If the position of the reference line 301 is adjusted to the position shown in FIG. 8(*b*), a size of the first region 302 after the adjustment is greater than that of the first region 302 prior to the adjustment and a size of the second region 303 after the adjustment is smaller than that of the second region 303 prior to the adjustment.

Since the video contents have been output to the first region 302, the number of the output video contents may increase in response to the increasing size of the first region 302. FIGS. 8(*b*) and 8(*c*) confirm that the number of the output contents is greater than that of the output contents shown in FIG. 8(*a*).

In addition, FIG. 8(*d*) shows that the sizes of the contents output to the first region 302 are changed in response to a user's input. That is, via the user's touch gesture performed on the first region 302 as shown in FIG. 8(*c*), the contents can be output as thumbnails, respectively, as shown in FIG. 8(*d*). For example, the touch gesture may include a drag input performed by pinching in two touched points. Thus, if the contents outputting method is changed, the user of the mobile terminal can view more video contents output to the first region 302.

Figure 9:
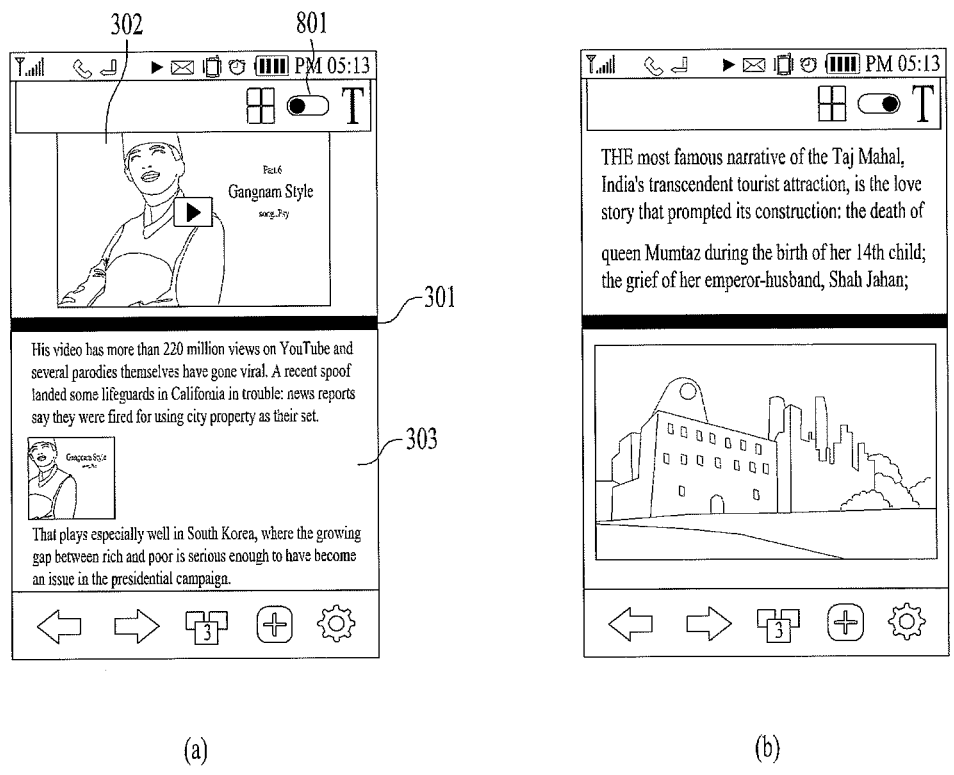
FIG. 9 includes display screens illustrating a method for sorting contents by types and outputting the sorted contents to partitioned regions according to one embodiment of the present invention.

The following description illustrates one example of discriminating contents of various types existing on a single webpage with reference to FIG. 9. In more detail, FIG. 9 includes display screens illustrating a method for sorting contents by types and outputting the sorted contents to partitioned regions according to one embodiment of the present invention.

Referring to FIG. 9(*a*), because the indicator of the sorting object 801 is situated at the left part, the controller 180 sorts video contents and then outputs the sorted video contents to the first region 302. In addition, the controller 180 outputs the rest of the contents except the video contents to the second region 303.

Referring to FIG. 9(*b*), the indicator of the sorting object 801 is situated toward the capital letter 'T'. Hence, the controller 180 sorts a text content and then outputs the sorted text content to the first region 302. In addition, the controller 180 outputs the rest of the contents except the text content to the second region 303.

In addition, N-screen technology outputs contents on a plurality of devices. In particular, the N-screen technology enables a single content to be simultaneously used by a plurality of devices. The following description describes how to apply the N-screen technology to partitioned regions.

Figure 10:
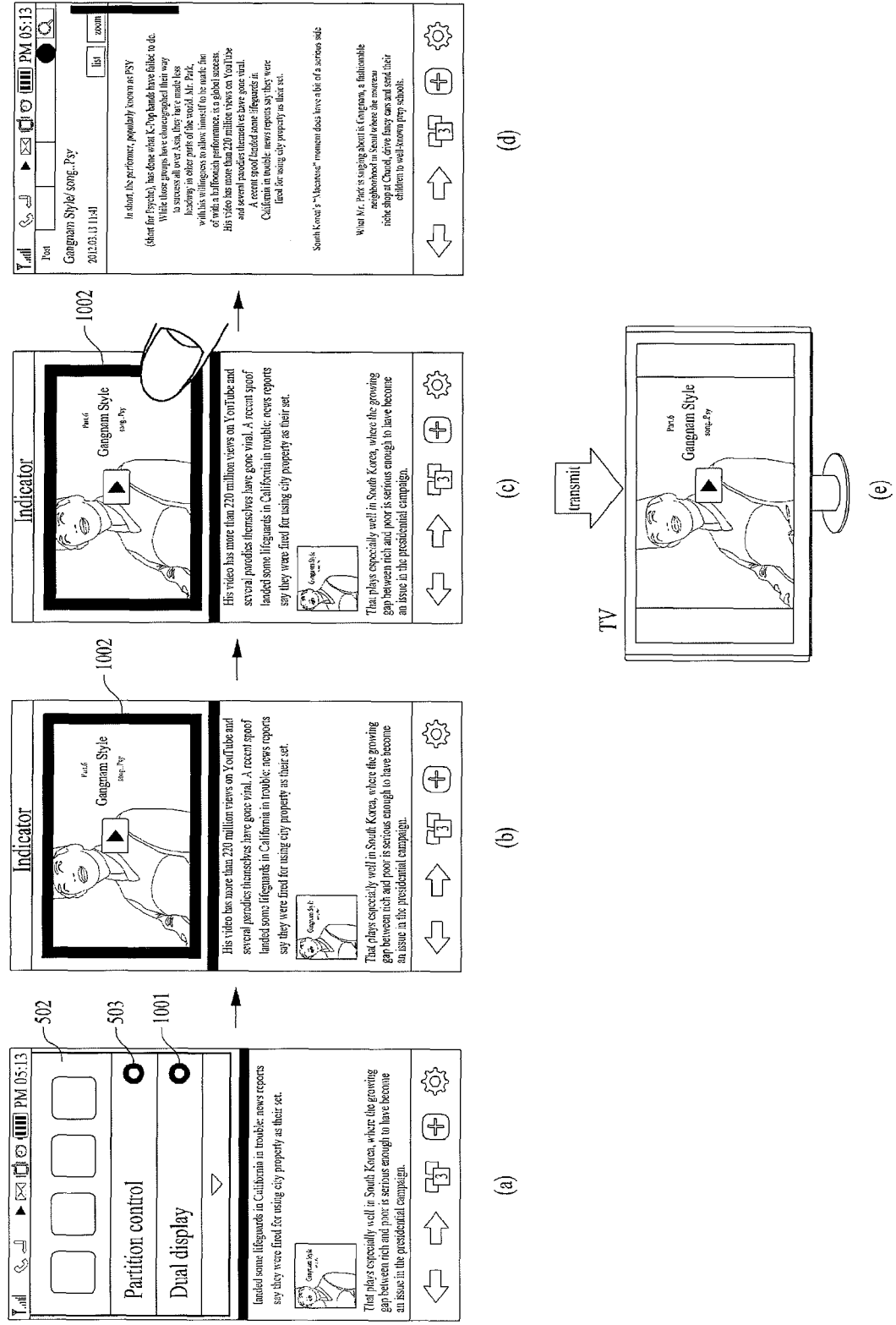
FIG. 10 includes display screens illustrating an N-screen activating process according to one embodiment of the present invention.

In more detail, FIG. 10 includes display screens illustrating an N-screen activating process according to one embodiment of the present invention. In particular, FIG. 10 illustrates a video content existing on a partitioned region being transmitted to another device.

In more detail, FIG. 10(*a*) shows that an N-screen menu screen 502 can be moved up and down on the display similar to that as shown in FIG. 5. As shown in FIG. 10(*a*), a dual display button 1001 is displayed on the menu screen 502. If the user selects the dual display button 1001, referring to FIG. 10(*b*), the controller 180 displays an indicator 1002 on a content transmittable to another device.

In particular, the indicator 1002 can have a pattern frame enclosing the content, as shown in FIG. 10(*b*), or may have one of various patterns including a character, a diagram, a number and the like. Moreover, such an animation effect as flickering, color change and the like may be given to the indicator 1002. Hence, a user of the mobile terminal 100 can recognize the transmittable content through the indicator 1002.

The user can also transmit the content to another device by clicking the content having the indicator 1002 displayed thereon. In particular, if the user inputs a selection of the content as shown in FIG. 10(*c*), the controller 180 transmits the corresponding content to another device. Referring to FIG. 10(*e*), the mobile terminal transmits a video content to a TV.

Meanwhile, it may be preferable not to display the content transmitted to another device on the mobile terminal. That is, because the user can view the corresponding content via a display of the other device, the transmitted content does not have to be displayed on the mobile terminal redundantly.

In more detail, referring to FIG. 10(*d*), the controller 180 hides the first region 302, on which the transmitted content has been displayed, and outputs the second region 303, to which the text content is being output, to the display unit 151. In particular, if the selected video content is transmitted to an external device, the controller 180 cancels the reference line and then outputs the rest of the multimedia contents except the transmitted video content on a full screen of the display.

Figure 11:
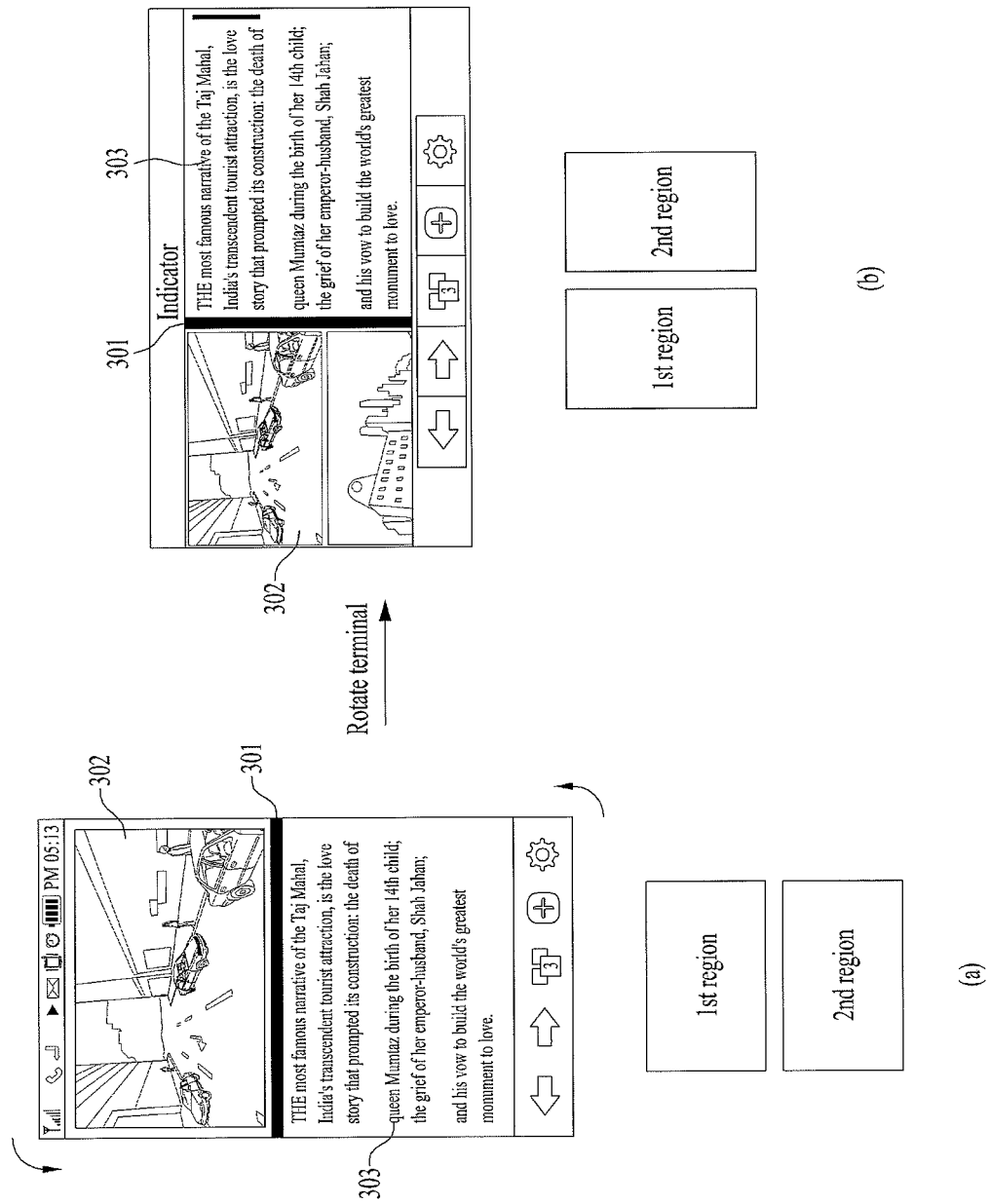
FIG. 11 includes display screens illustrating a method for rotating contents by fixing a reference line on a rotating mobile terminal according to one embodiment of the present invention.

Next, FIG. 11 includes display screens illustrating a method for rotating contents by fixing a reference line when rotating a mobile terminal according to one embodiment of the present invention. That is, a user may occasionally intend to change a display mode into a landscape mode from a portrait mode. Thus, the user can incline the display, whereby contents output to the display are rotated counterclockwise to be suitable for the user.

In more detail, FIG. 11(*a*) shows a user holding the mobile terminal in a vertical direction. Referring to FIG. 11(*a*), the reference line 301 is displayed in the horizontal direction and the first and second regions 302 and 303 are displayed at an upper region and a lower region, respectively.

If the sensing unit 140 detects the inclination or rotation of the mobile terminal, the controller 180 rotates the contents output to the first and second regions 302 and 303 by fixing the reference line 301 thereto as shown in FIG. 11(*b*). In particular, the first and second regions 302 and 303, which are separated from each other by the reference line 301, are independently rotated.

Figure 12:
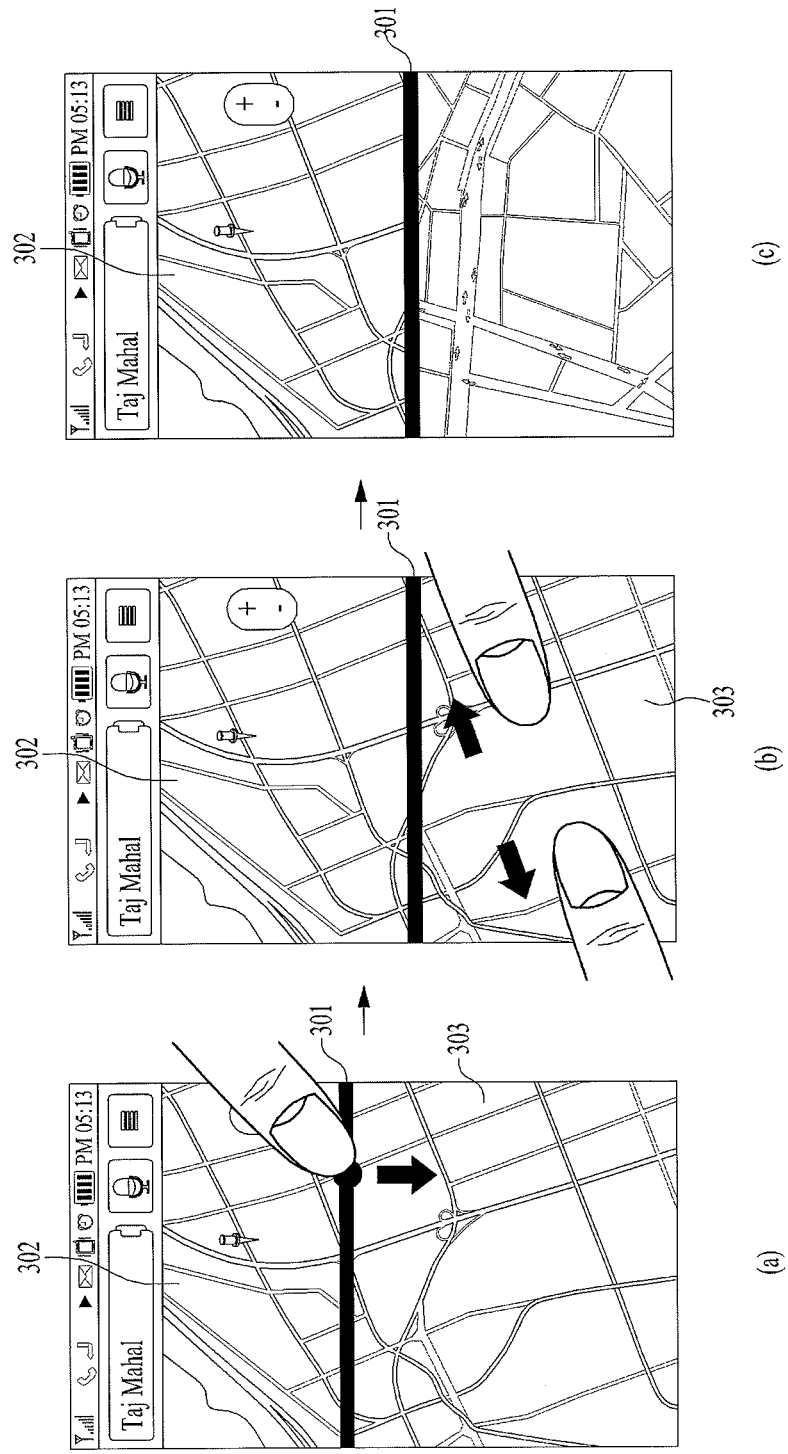
FIG. 12 includes display screens illustrating a method for controlling a screen output per region partitioned by a reference line according to one embodiment of the present invention.

Next, FIG. 12 includes display screens illustrating a method for controlling a screen output per region partitioned by a reference line according to one embodiment of the present invention.

Referring to FIG. 12(*a*), a map application is active in the mobile terminal 100 and the reference line 301 is displayed in the middle of the output map. In addition, a user of the mobile terminal may want to only enlarge the map output to the second region 303. Thus, according to one embodiment of the present invention, the first region 302 and the second region 303 divided by the reference line 301 are independently controlled.

In particular, if a touch command for enlarging the map displayed on the second region 303 is input, the controller 180 enlarges only the map output to the second region 303 and does not change the map output to the first region 302. The touch command used for enlarging the map may include a drag input performed by pinching out two touched points (FIG. 12(*b*)). FIG. 12(*c*) shows that the map output to the second region 303 is only enlarged while the portion of the map in the first region 302 is unchanged.

Figure 13:
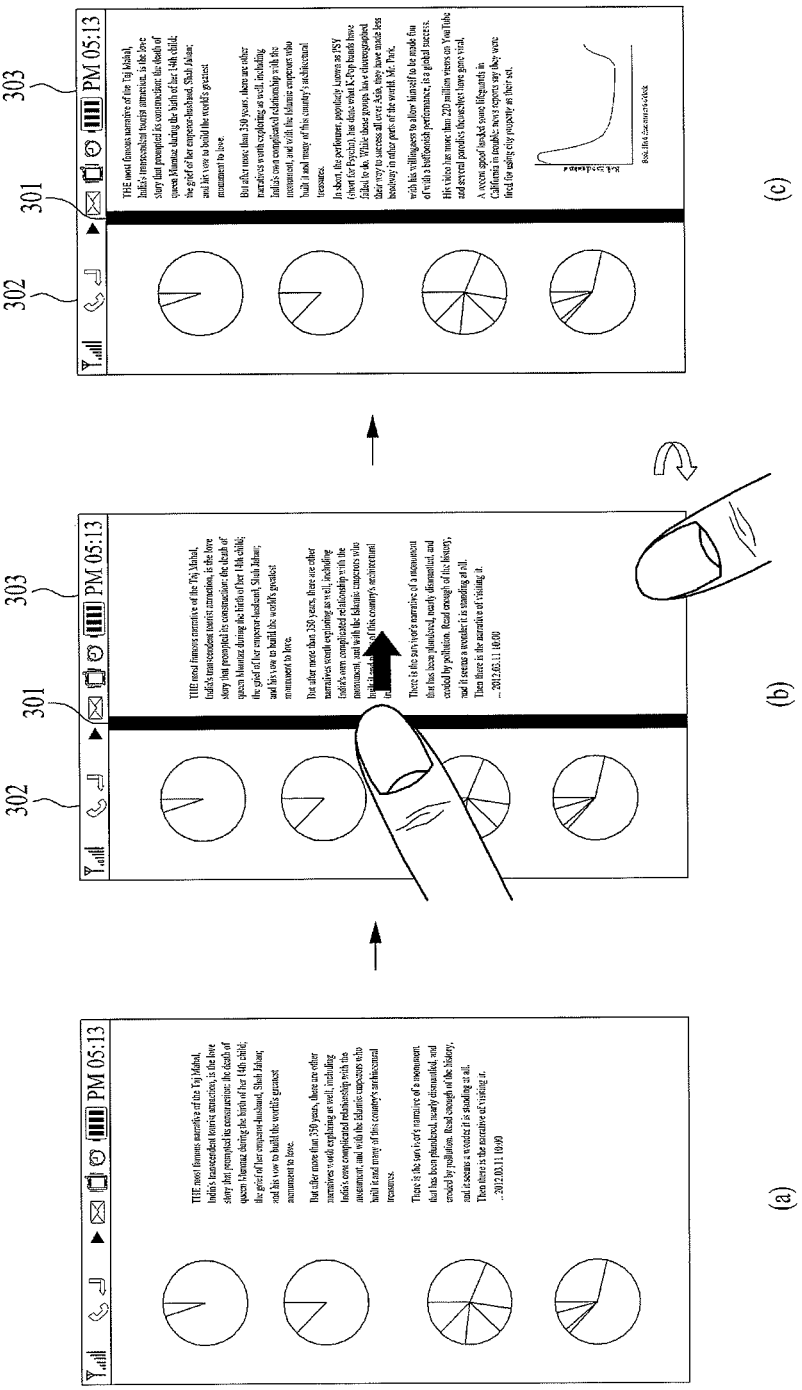
FIG. 13 includes display screens illustrating a method for controlling a screen output per region partitioned by a reference line according to another embodiment of the present invention.

In addition, FIG. 13 includes display screens illustrating a method for controlling a screen output per region partitioned by a reference line according to one embodiment of the present invention. In particular, FIG. 13 illustrates reading information such as a magazine or article using the mobile terminal.

In more detail, FIG. 13(*a*) shows a page of the magazine, for example, and FIG. 13(*b*) illustrates the reference line 301 displayed in a vertical direction on the page in response to a user's input. Further, as discussed above, an output to one region can be fixed and an output to another region can be changed. For instance, while graphs are maintained or fixed on the magazine page shown in FIG. 13(*a*), the user may want to scroll text to a next page, for example.

Therefore, according to one embodiment of the present invention, the screen portion displayed on the first region 302 corresponding to a left region and the other screen portion displayed on the second region 303 corresponding to a right region are independently controlled with reference to the reference line 301.

In particular, if the user inputs a touch command for scrolling to a next page via the second region 303 (FIG. 13(*b*)), the controller 180 scrolls the page currently displayed on the second region 303 to the next page while maintaining the screen currently output to the first region 302 intact.

According to an embodiment of the present invention, information saved in the mobile terminal can be utilized more efficiently. In the following description, a method of utilizing a phonebook application more efficiently according to an embodiment of the present invention is explained.

Figure 14:
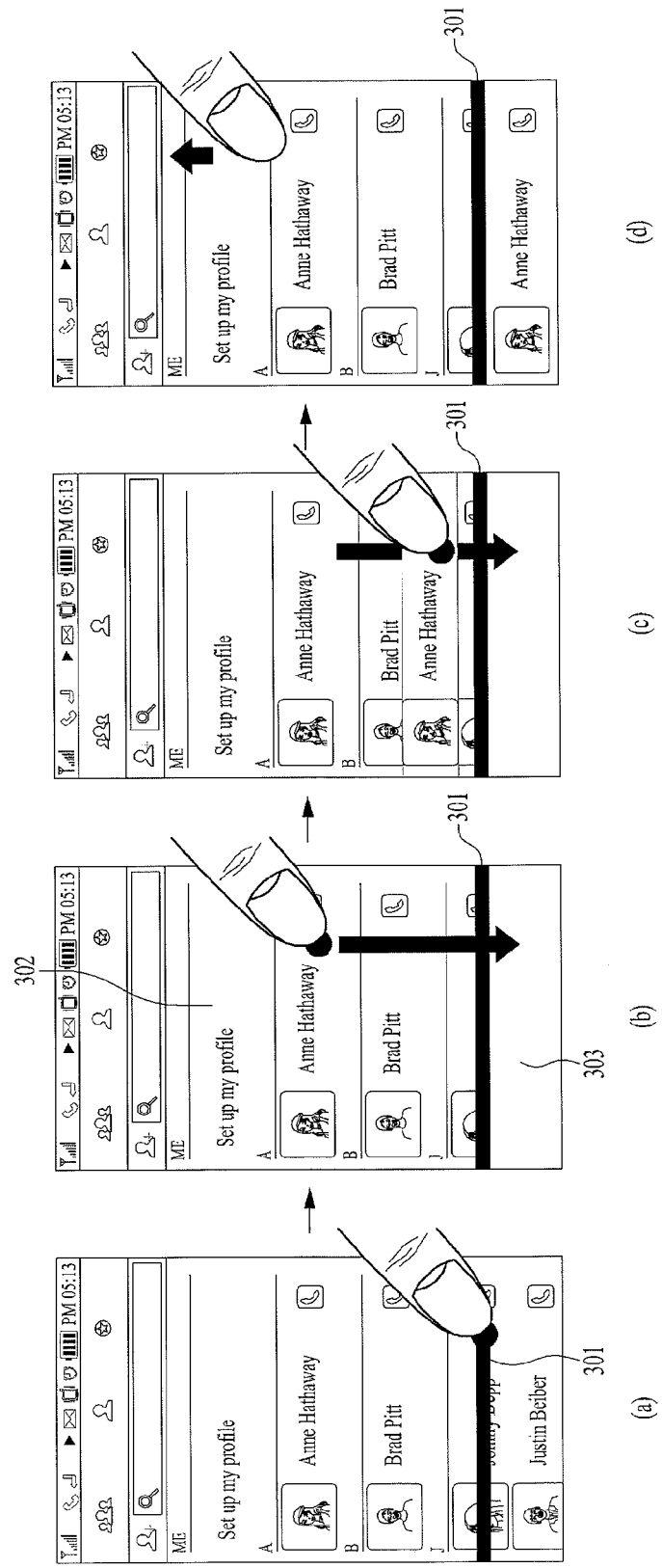
FIG. 14 includes display screens illustrating a method for aligning objects according to one embodiment of the present invention.

In particular, FIG. 14 includes display screens illustrating a method for aligning objects according to one embodiment of the present invention. Referring to FIG. 14(*a*), the controller 180 displays a list of contact items on the display unit 151. Because there are too many contact items to be displayed on a single screen, the user can scroll through the list of contact items.

In addition, the user may want to select prescribed contact items from the list of the above-aligned contact items. For instance, assuming the contact items include contact 1 to contact 50. Then, the user can select and align the contact 2, the contact 5 and the contact 10. The user can then collectively utilize the selected and aligned contact items using such a function as a group chat, a group email, a grouping, a group call and the like. For instance, the user may want to send a group text to the contact 2, the contact 5 and the contact 10.

Therefore, according to an embodiment of the present invention, the reference line 301 divides the screen into the first region 302 and the second region 303. If the item in the first region 302 is selected via the user input unit 130, the controller 180 then displays the selected item on the second region 303.

In particular, FIG. 14(*b*) shows the screen partitioned into the first region 302 and the second region 303 by the reference line 301. After the regions have been separated, if the user selects one of the contact items existing in the first region 302, the controller 180 displays the selected contact item in the second region 303. In particular, the user's touch input for the selection may include a touching of the contact item, dragging the contact item to the second region 303, and then releasing the touch from the contact item.

For example, FIG. 14(*c*) shows that the contact item in the first region 302 is touched and dragged into the second region 303. In addition, the controller 180 creates an effect as if the corresponding contact item is attached to a user's finger while the touch and drag operation is performed. In particular, when the contact item is touched and dragged, the corresponding item can move together with the movement of the touched position.

In addition, FIG. 14(d) shows that the item is added to the second region 303. That is, the contact of 'Anne Hathaway' corresponding to the contact item added in response to the user's selection is displayed on the second region 303 as shown in FIG. 14(d). By the above-mentioned method, the user selects contact items from the list displayed on the first region 302 and the controller 180 can then align the contact items selected by the user on the second region 303. The user can then perform an operation with respect to all contacts included in the second region 303 such as a message chat, email, SMS message, video call, etc.

Figure 15:
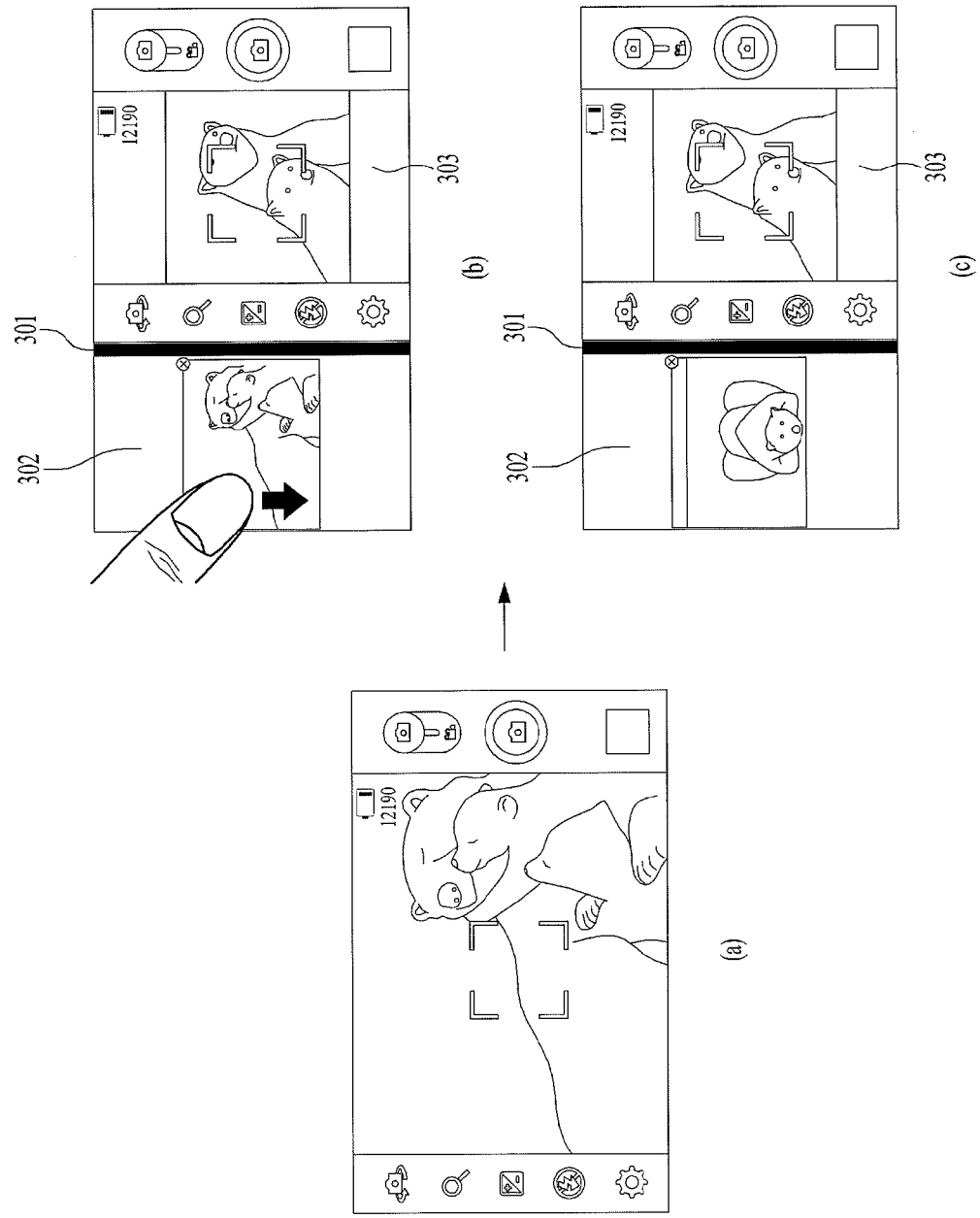
FIG. 15 includes display screens illustrating a method for performing screen partition on a camera photographing screen according to one embodiment of the present invention.

Next, FIG. 15 includes display screens illustrating a method for performing a screen partition on a camera photographing screen according to one embodiment of the present invention. In particular, FIG. 15(a) shows a screen for taking a picture via the mobile terminal 100.

After the reference line 301 has been displayed in response to the user's input, as mentioned in the foregoing description, the display screen is portioned into first and second regions 302 and 303 as shown in FIG. 15(b). Referring to FIG. 15(b), after the controller 180 has partitioned the screen into the first region 302 and the second region 303 by the reference line 301, the controller 180 displays a screen for taking a picture on the second region 303 and also displays a saved picture or a previously taken picture on the first region 302.

In particular, the user can view the previously taken picture as soon as he or she takes the picture via the mobile terminal 100, thereby facilitating picture-taking by comparing a currently taken picture to the previously taken picture.

While the previously taken picture is viewed in the first region 302 shown in FIG. 15(b), the previously taken picture may be changed into another picture in response to a user's touch input. For instance, if the user touches and drags a prescribed point on the first region 302 in a top direction, the controller 180 can display a previous picture.

On the other hand, if the user touches and drags a prescribed point on the first region 302 in a bottom direction, the controller 180 display a next picture. In particular, FIG. 15(c) shows the controller 180 displaying a next picture in response to an input of a user's touch.

As mentioned in the above description with reference to FIG. 15, if the reference line 301 is configured in response to a user's input, the user can view a previously taken picture when taking a new picture, making it easier for the user to take pictures.

Figure 16:
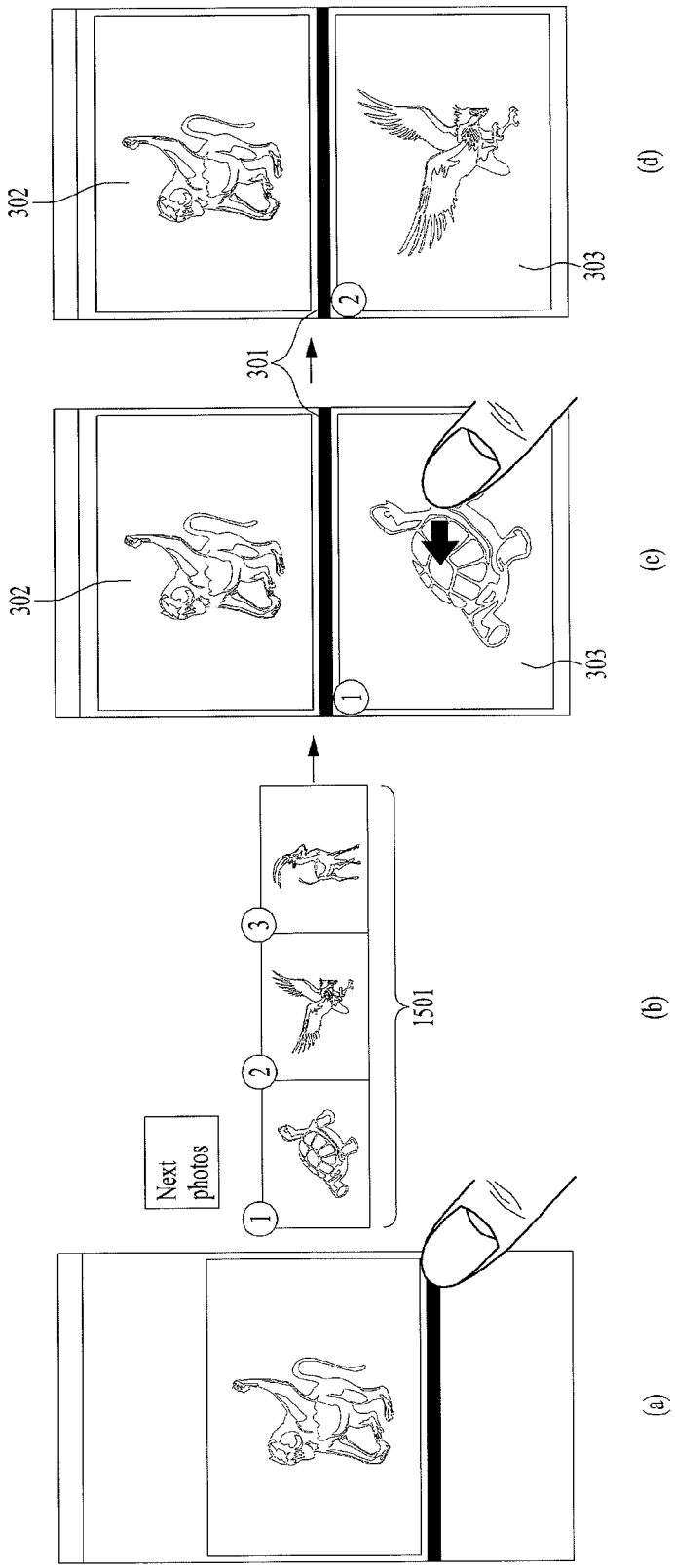
FIG. 16 includes display screens illustrating a photo viewing control method by partitioning a screen according to one embodiment of the present invention.

Next, FIG. 16 includes display screens illustrating a photo viewing control method by partitioning a screen according to one embodiment of the present invention. In particular, FIG. 16(a) shows a screen for viewing a photo in a photo gallery in general.

FIG. 16(b) shows photos 1501 next to a currently viewed photo. In this instance, the photos 1501 are not output to a current screen. A numeral at a left top end of each of the next photos 1501 indicates an order of the corresponding photo.

If the reference line 301 is displayed in response to the user' input, referring to FIG. 16(c), the controller 180 partitions a screen of the display unit 151 into the first region 302 and the second region 303 by the reference line 301. In particular, the photo viewed before the partition is displayed in the first region 302 and a photo next to the former photo viewed before the partition is displayed in the second region 303.

According to an embodiment of the present invention, in order to compare photos to each other, a user can view one photo while viewing another photo. Therefore, the controller 180 partitions the screen of the display unit 151 into the first region 302 and the second region 303 by the reference line 301 and can then separately control photos to be displayed to the first region 302 and the second region 303, respectively.

Moreover, the controller 180 can change a photo output to the first region 302 or the second region 303 into another photo in response to a user's touch input. For instance, after a user has touched a prescribe point on the second region 303, and performs a drag in the left direction while maintaining the touch, the controller 180 changes a current photo into a previous photo. On the other hand, if the user performs a drag in right direction while maintain the touch, the controller 180 changes a current photo into a next photo. Thus, the user can change the photo currently output to the first region 302 or the second region 303 into a previous or next photo.

Accordingly, embodiments of the present invention provide several advantages. For example, a wide display can be efficiently utilized. Also, a display is partitioned into a plurality of regions and each of the partitioned regions can be independently controlled. Also, a content currently output to one of the regions can be transmitted to another device, and the transmitted content can be efficiently controlled. The contents can also be efficiently sorted and displayed in the different regions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include transmission via Internet. Further, the computer may include the controller 180 of the terminal.

Further, the content displayed on the mobile terminal may be still image data including 2D image data, 3D image data and holographic image data. The content may also include 3D image data, movies, etc. All content is included that can be displayed on the display unit.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
  a wireless communication unit configured to wirelessly communicate with at least one other terminal;
  a touch screen display configured to display contents; and
  a controller configured to:
    receive a touch and drag action across the touch screen display, display a moveable partitioning graphic at a position corresponding to the touch and drag action and partition the displayed contents into first and second display regions, and independently control a function of the contents in the first display region and independently control a function of the contents in the second display region, wherein the displayed contents include non-text data and text data and the controller is further configured to group the non-text data into one of the first or second display regions and to group the text data into the other of the first and second display regions, the non-text data including still image data and moving image data, and wherein the controller is further configured to display a shiftable icon that can be shifted in a first direction to group the non-text data into said one of the first or second display regions and that can be shifted in a second direction to group the text data into said other of the first and second display regions.

2. The mobile terminal of claim 1, wherein the independently controlled function includes one of a scrolling function and a zooming function.

3. The mobile terminal of claim 1, wherein the moveable partitioning graphic is a slide bar that can be touched and dragged on the touch screen display to change a position of the slide bar.

4. The mobile terminal of claim 1, wherein the controller is further configured to:
receive a selection signal indicating a selection of the non-text data or the text data displayed in the first and second display regions, and
control the wireless communication unit to transmit the selected non-text data or the text data to the at least one other terminal.

5. The mobile terminal of claim 4, wherein the controller is further configured to stop displaying the non-text data or the text data in the first or second display regions after transmitting the selected non-text data or the text data to the at least one other terminal.

6. The mobile terminal of claim 1, wherein the contents include a plurality of items, and the plurality of items are displayed in the first display region, and
wherein the controller is further configured to display items selected from the first display region in the second display region based on a touch and drag action from the first display region to the second display region.

7. The mobile terminal of claim 1, wherein the contents include a gallery of non-text data, and
wherein the controller is further configured to display a first non-text data in the first display region and additional non-text data in the second display region.

8. A method of controlling a mobile terminal, the method comprising:
allowing, via a wireless communication unit, wireless communication with at least one other terminal;
displaying, via a touch screen display, contents;
receiving, via a controller, a touch and drag action across the touch screen display;
displaying, via the controller, a moveable partitioning graphic at a position corresponding to the touch and drag action and partitioning the displayed contents into first and second display regions; and
independently controlling, via the controller, a function of the contents in the first display region and independently controlling a function of the contents in the second display region,
wherein the displayed contents include non-text data and text data and the method further comprises grouping the non-text data into one of the first or second display regions and grouping the text data into the other of the first and second display regions, the non-text data including still image data and moving image data, and
wherein the method further comprises displaying a shiftable icon that can be shifted in a first direction to group the non-text data into said one of the first or second display regions and that can be shifted in a second direction to group the text data into said other of the first and second display regions.

9. The method of claim 8, wherein the independently controlled function includes one of a scrolling function and a zooming function.

10. The method of claim 8, wherein the moveable partitioning graphic is a slide bar that can be touched and dragged on the touch screen display to change a position of the slide bar.

11. The method of claim 8, further comprising:
receiving a selection signal indicating a selection of the non-text data or the text data displayed in the first and second display regions; and
transmitting, via the wireless communication unit, the selected non-text data or the text data to the at least one other terminal.

12. The method of claim 11, further comprising:
stop displaying the non-text data or the text data in the first or second display regions after transmitting the selected non-text data or the text data to the at least one other terminal.

13. The method of claim 8, wherein the contents include a plurality of items, and the plurality of items are displayed in the first display region, and
wherein the method further comprises displaying items selected from the first display region in the second display region based on a touch and drag action from the first display region to the second display region.

14. The method of claim 8, wherein the contents include a gallery of non-text data, and
wherein the method further comprises displaying a first non-text data in the first display region and additional non-text data in the second display region.

* * * * *